United States Patent [19]
Cohen

[11] Patent Number: 5,882,531
[45] Date of Patent: Mar. 16, 1999

[54] WATER FILTRATION TECHNIQUE USING GRANULAR MEDIA

[75] Inventor: Joseph D. Cohen, Aurora, Colo.

[73] Assignee: Performance Pool Products, Ltd., Aurora, Colo.

[21] Appl. No.: 754,098

[22] Filed: Nov. 13, 1996

[51] Int. Cl.$^6$ .......................... B01D 24/10; B01D 24/46
[52] U.S. Cl. .................... 210/793; 210/807; 210/279; 210/289; 210/352
[58] Field of Search ..................... 210/793, 794, 210/795, 807, 279, 289, 291, 350, 351, 352, 275

[56] References Cited

U.S. PATENT DOCUMENTS

| | | | |
|---|---|---|---|
| 165,377 | 7/1875 | Sinclaire | 210/289 |
| 3,557,955 | 1/1971 | Hirs et al. | 210/276 |
| 3,826,375 | 7/1974 | Fournier | 210/289 |

OTHER PUBLICATIONS

Rowley, William "Filters: A Brief Discussion of DE, Sand & Cartridge Types," NSPI Aquatic Symposium, Apr. 1, 1985, Houston, Texas.

"Sta–Rite System 3 High Rate Sand Filters Owner's Manual–Installation, Operation & Parts –Models S7S50 S8S70," © 1993, Sta–Rite Industries, Inc., Sta–Rite Pool/Spa Group, 600 S. Jefferson Street, Waterford, WI 53185.

"Hydromation ®Technical Update" brochure, publ. on or before Oct. 1996, Headquarters, 400 Town Center, Suite 1000, Southfield, MI 48075–1410.

"Hydromation®In–Depth Filtration Systems" brochure, publ. on or before Oct. 1996, Headquarters, 400 Town Center, Suite 1000, Southfield, MI 48075–1410.

"Automatic High Rate Sand Filtration Systems" brochure, publ. on or before Oct. 1996, Neptune & Benson, Inc., One Bridal Avenue, P.O. Box 578, West Warwick, RI 02893.

"STC/DTC Series Triple Cell Sand Filters" brochure, publ. on or before Oct. 1996, Neptune & Benson, Inc., One Bridal Avenue, P.O. Box 578, West Warwick, RI 02893.

"SDC/DDC Series Dual Cell Sand Filters" brochure, publ. on or before Oct. 1996, Neptune & Benson, Inc., One Bridal Avenue, P.O. Box 578, West Warwick, RI 02893.

"SRF Series Single Cell Sand Filters" brochure, publ. on or before Oct. 1996, Neptune & Benson, Inc., One Bridal Avenue, P.O. Box 578, West Warwick, RI 02893.

"SHF Series Horizontal Sand Filters" brochure, publ. on or before Oct. 1996, Neptune & Benson, Inc., One Bridal Avenue, P.O. Box 578, West Warwick, RI 02893.

"Carbon Tower with Media Retaining Underdrain" brochure, publ. on or before Oct. 1996, Western Filter Company, 4545 East 60$^{th}$ Avenue, Denver, Colorado 80216.

"Sta–Rite High Rate Sand Filters Owner's Manual –Installation, Operation & Parts –Models HRPB20, HRPB24 HRPB30," © 1994, Sta–Rite Industries, Inc., Sta–Rite Pool/Spa Group, 600 S. Jefferson Street, Waterford, WI 53185.

(List continued on next page.)

*Primary Examiner*—Ivars Cintins
*Attorney, Agent, or Firm*—Carol W. Burton; Holland & Hart LLP

[57] ABSTRACT

A water filtration technique is designed to maximize the efficient performance of a variety of granular filtration media. The technique maintains the granular filtration media in a compacted state between a perforated outer media container and a perforated inner media container, where the perforated inner media container is a smaller similitude of the perforated outer media container. In the preferred embodiment of the filtration device of the present invention, the perforated outer and inner media containers are substantially spherical. By maintaining the granular filtration media in a static-state throughout filtration, highly efficient filtration is achieved. In contrast, during the backwash function, the normal inward flow is reversed to outward radial flow and granular filtration media is agitated, fluidized and quickly and vigorously cleaned. A plurality of high-velocity centrally-located water jets create the outward radial flow during backwashing.

26 Claims, 9 Drawing Sheets

OTHER PUBLICATIONS

"Wicor 1995 Annual Report," Wicor, 262 East Wisconsin Avenue, Milwaukee, WI 53202.

"Hydro–Rate Hi–Rate Sand Pool Filters Owners Manual Models HRV–24, HRV–30 & HRV–36," publ. on or before Oct. 1996, Baker–Hydro Incorporated, 1864 Tobacco Road, August, GA 30906.

"Astral 42–47" Polyester Sand Filters brochure, ©1994 Astral Products, Inc., 7869 Bayberry Road, Jacksonville, FL 32256.

Van Rossen, Donald P., "Pool/Spa Operators Handbook," ©1983 The National Swimming Pool Foundation, 10803 Gulfdale, Suite 300, San Antonio, Texas 78216, Ch. 3, pp. 11–18.

WATER FILTRATION TECHNIQUE USING GRANULAR MEDIA

FIELD OF THE INVENTION

The present invention relates to water filtration systems in which water is filtered through granular media to remove dissolved and suspended material from the water. More particularly, the present invention relates to water filtration systems in which granular media such as silica sand, fractured anthracite coal, ion exchange resins, and activated carbon, are contained within a pressure vessel. Water to be treated is passed through the granular media and material dissolved or suspended in the water collects in the granular media, and the material so collected is subsequently removed from the granular media by backwashing or other media regeneration process.

BACKGROUND OF THE INVENTION

Many water filtration devices utilize granular water filtration media contained in a pressure vessel through which unfiltered water is treated. As shown in FIGS. 1a, 1b, 2 and 3, such conventional water filtration devices include an exterior pressure vessel in which a water distributor is positioned near the top of the pressure vessel. Water to be filtered is introduced into the vessel through the water distributor. The water to be filtered then flows through granular media resting in the bottom of the pressure vessel. Initially, the granular media presents a generally flat, circular upper surface to the unfiltered water. An underdrain is positioned at the bottom of the pressure vessel to collect the filtered water after it passes through the granular media and suspended and dissolved material in the water collects on the granular media. The water flow during filtration is typically downward, as in shown in FIG. 1a.

It is desirable for such water filtration devices to achieve fast flow rates while maintaining a high capacity for removing contaminants. Flow rates are dependent, in part, on the exterior surface area of the granular media exposed to the flow of unfiltered water and the length of the flow path. The length of the flow path is typically the depth of the granular media, commonly called the bed depth. Unfortunately, both the exterior surface area of the granular media and the flow path length are relatively fixed in conventional filtration devices like that shown in FIG. 1a.

Figure 3:
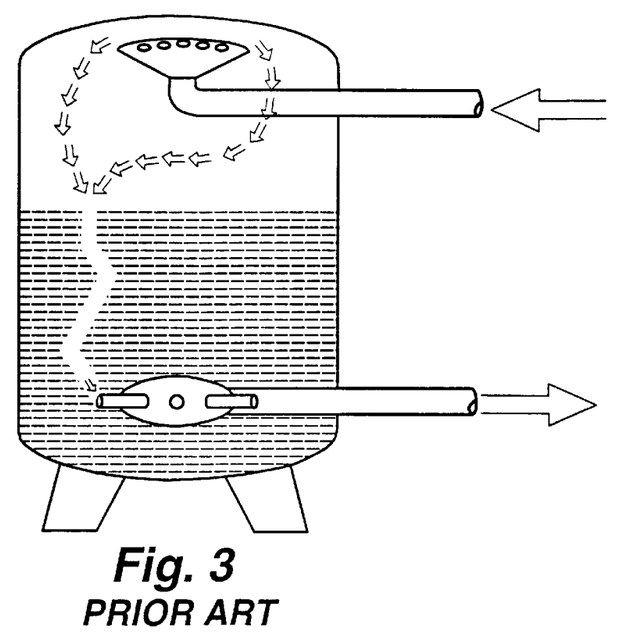
FIG. 3 is a vertical section view of the conventional granular media water filtration device shown in FIG. 1a in filtration mode exhibiting low flow channeling of the granular media.

Moreover, the flow path in many conventional water filtration devices is not widely distributed throughout the filter media, but rather quickly forms into one or a few arbitrary flow paths during the filtration process. When arbitrary flow paths form, the filter media adjacent the flow path becomes overused and prematurely exhausted, with the rest of the filter media underused. One such arbitrary flow path is shown in FIG. 3, where the path of least resistance to the water is a shortened path directly under the water distributor to the underdrain.

To compensate for the anticipated inefficient use of only a part of a media bed resulting from formation of arbitrary flow paths, the bed depth and volume is increased. Extra media is thus required, increasing the overall weight of the filtration device undesireably.

Figure 2:
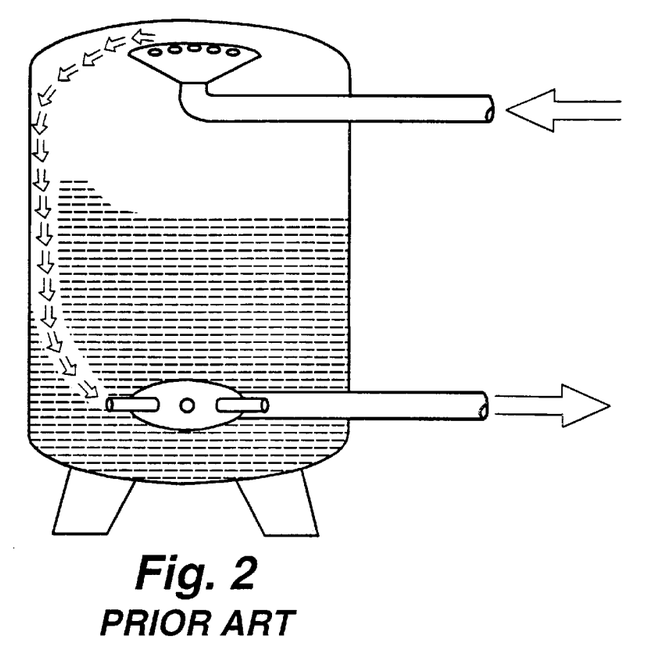
FIG. 2 is a vertical section view of the conventional granular media water filtration device shown in FIG. 1a in filtration mode exhibiting high flow channeling of the granular media.

Another inherent problem with many conventional water filtration systems is the movement of the granular media during filtration. Most granular media work best if their individual grains are in a static state and are not allowed to move about during the normal filtration processes. In an effort to obtain high through put, however, individual grains of the granular media are often disturbed. Buildup of contaminants on the exterior surface of the media bed can also disturb the individual grains when high flow rates are used, as is shown in FIG. 2 where a channel along the vessel wall is temporarily dug and a mound is temporarily formed on the surface.

Figure 1A:
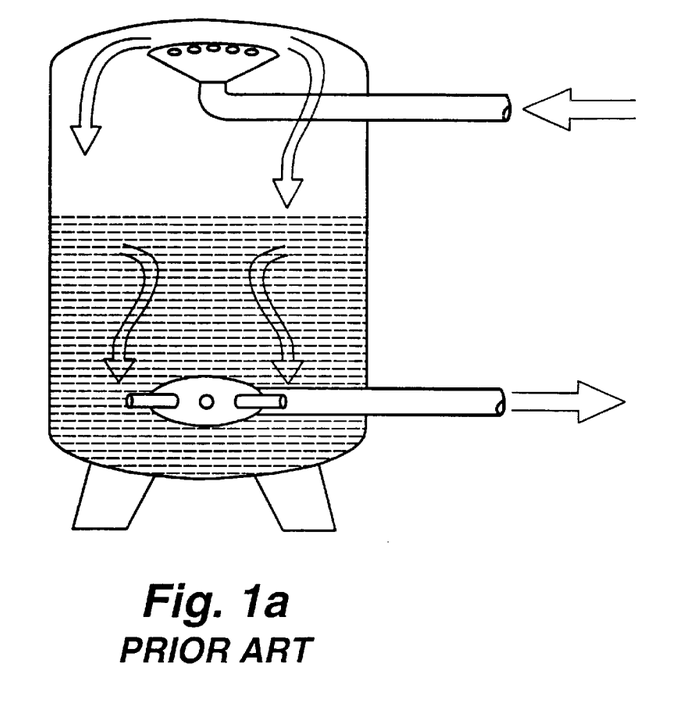
FIG. 1a is a vertical section view of a conventional granular media water filtration device in filtration mode.
Figure 1B:
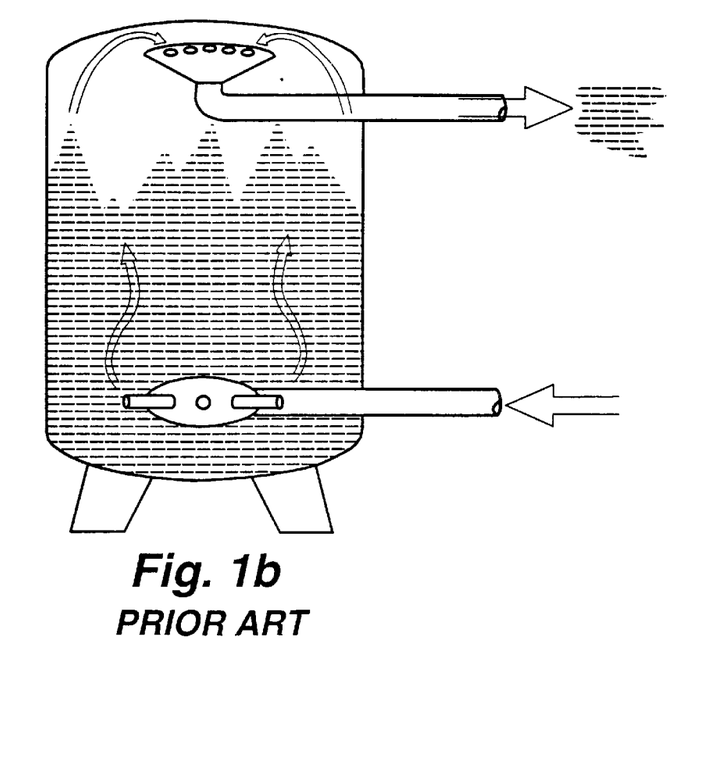
FIG. 1b is a vertical section view of the conventional granular media water filtration device shown in FIG. 1a in backwashing mode.

Conventional water filtration systems employing granular media typically require some type of media recharging after a period of use because the granular media gradually becomes covered with the waste material and efficiency is reduced. To periodically regenerate the granular media, a backwash cycle is invoked. As is shown in FIG. 1b, the normally downward flow from the distributor to the underdrain is temporarily reversed. In the backwash cycle, water is transmitted through the underdrain, up through the granular media, and out the water distributor, carrying with it the waste materials. During this process, the granular media becomes fluidized.

Naturally, an efficient backwash cyle is desireable. However, with conventional systems, when then backwash rate is speeded up to maximize backwash rates and minimize filter downtime, excessive flow rates can cause the granular media to flow out of the filter out the water distributor. Filter media which is lost must then be replaced. In addition, backwashing of conventional systems often takes an excessive amount of time, typically 5–30 minutes, when water filtration operations must be suspended.

It is against this background that the significant improvements and advancements of the present invention have taken place in the field of granular media water filtration.

SUMMARY OF THE INVENTION

It is an object of the present invention to organize the loose filtration media within the filter pressure vessel so as to create a media body with the highest possible exterior surface area with the shortest possible workable flowpath so as to provide the highest possible capacity for contaminants with the lowest restriction to flow. Geometrically, the ideal shape to achieve these results is a hollow orb, and the present invention forms the loose media into this shape.

It is also an object of the present invention to eliminate any possibility of filter malfunction by flow-related disruption of the media body. Because in the present invention the media is mechanically compacted into a hollow orbicular shape, and is held in a static-state by mechanical pressure, the possibility of movement between the media grains is therefore eliminated. For example, the possibility of what is commonly referred to as high flow channeling is eliminated in this design. High flow channeling is a situation usually caused by excessive flow during filtration, or a calcified exterior surface of the media body. When this malfunction occurs, the water flow temporarily digs a hole through the media body and passes through the filter without filtration occurring.

In the present invention the loose granular media is held in a static-state by mechanical pressure, as opposed to the conventional filter where the loose granular media is held together only by the forces of gravity and the resistance of the downward flow of the water (hydrodynamic packing). It is therefore an object of the present invention to improve the performance of certain media, especially those used for particulate filtration. This filtration performance in the present invention is improved because the mechanical pressure of compaction exerted on the body of media is substantially higher than the combined forces of gravity and hydrodynamic packing used in conventional filtration. This higher pressure of compaction of the media body in the present invention reduces the cumulative interstitial void space to a minimum. The resulting smaller interstices between the media grains entrap and remove smaller particulate from water.

Since filtration media of the present invention is mechanically compacted in a media container inside a pressure vessel and is not loose media being required to gravitate to the bottom of the pressure vessel as it must in the conventional filter, the media used in the present invention can be a buoyant material. A buoyant media is desirable for filtration because it fluidizes faster during the backwash cycle. This is because a buoyant media does not have to overcome gravity to fluidize. However, this desirable buoyant media cannot be used in a conventional filter. This is because the conventional filter relies on gravity to align the media grains and hold them in a static-state in the bottom of the pressure vessel, so, the media in a conventional filter must sink and cannot be buoyant.

Also, because the present invention relies on mechanical pressure rather than gravity to compact the loose media within the pressure vessel, the present invention will function properly in a weightless environment, like a space station in orbit about the earth. A conventional filter will not work in a weightless environment because it relies on gravity to function.

It is also an object of the present invention to eliminate any possibility of filter malfunction by a non-uniform exhaustion of the media. This problem commonly occurs during slow flow filtration. A constant slow flow during filtration can cause the premature failure of a conventional filter. This is because the resulting continuous arbitrary flowpath through the media body quickly exhausts the small amount of media along that flowpath, and the contaminants then begin to prematurely break through the filter. This filtration problem is commonly referred to as low flow channeling and is a very common problem with de-ionizing systems, water softeners, and carbon filters. Because of its orbicular radial design, the present invention can be assembled with an optional rotating flow director within its inner drain to provide a uniform and constantly-changing flowpath creates a systematic exhaustion of all the media in all the sectors of the media body, and eliminates the possibility of low flow channeling A further object of the present invention is to retain the filtration media during the backwash cycle. The media container in the present invention reacts to the reversed flow of the backwash cycle by expanding and allowing the loose granular media to fluidize and move about within the media container. However, the media cannot escape the confines of the media container and thusly cannot escape from the pressure vessel. A common problem with conventional filters is for the filtration media to go out through the distributor and be lost when subjected to the upwards flow of the backwash cycle. If this happens the media is permanently lost with the washwater discharge. The backwash flowrate of a conventional filter is critical because excessive flow results in the loss of the vital filtration media.

Another object of the present invention is to change the flow characteristics form a high-volume flow during normal filtration flow, to a low-volume, high-pressure high-velocity flow during the reversed flow of the backwash cycle, much like restricting the nozzle of a hose. The desirable result is that the media in the present invention gets both a quick and vigorous cleaning that requires less water and time than a conventional system consumes to backwash its media.

Because the orbicular media container of the present invention occupies a much higher percentage of the pressure vessel interior than does the media body of a conventional system, the amount of unfiltered water within the pressure vessel interior (freeboard) is greatly reduced. This reduction in freeboard results in less water being required for backwashing. This is because once the media has been cleaned in the reverse flow of the backwash cycle, there is less dirty water left to displace in the pressure vessel freeboard.

BRIEF DESCRIPTION OF THE DRAWINGS

FIG. 6b is a side view of the filtration assembly shown in FIG. 6a.

FIG. 7b is an isometric view of an individual hinged leaf pair component of the mechanical bellows shown in FIG. 7a.

DETAILED DESCRIPTION

Figure 4:
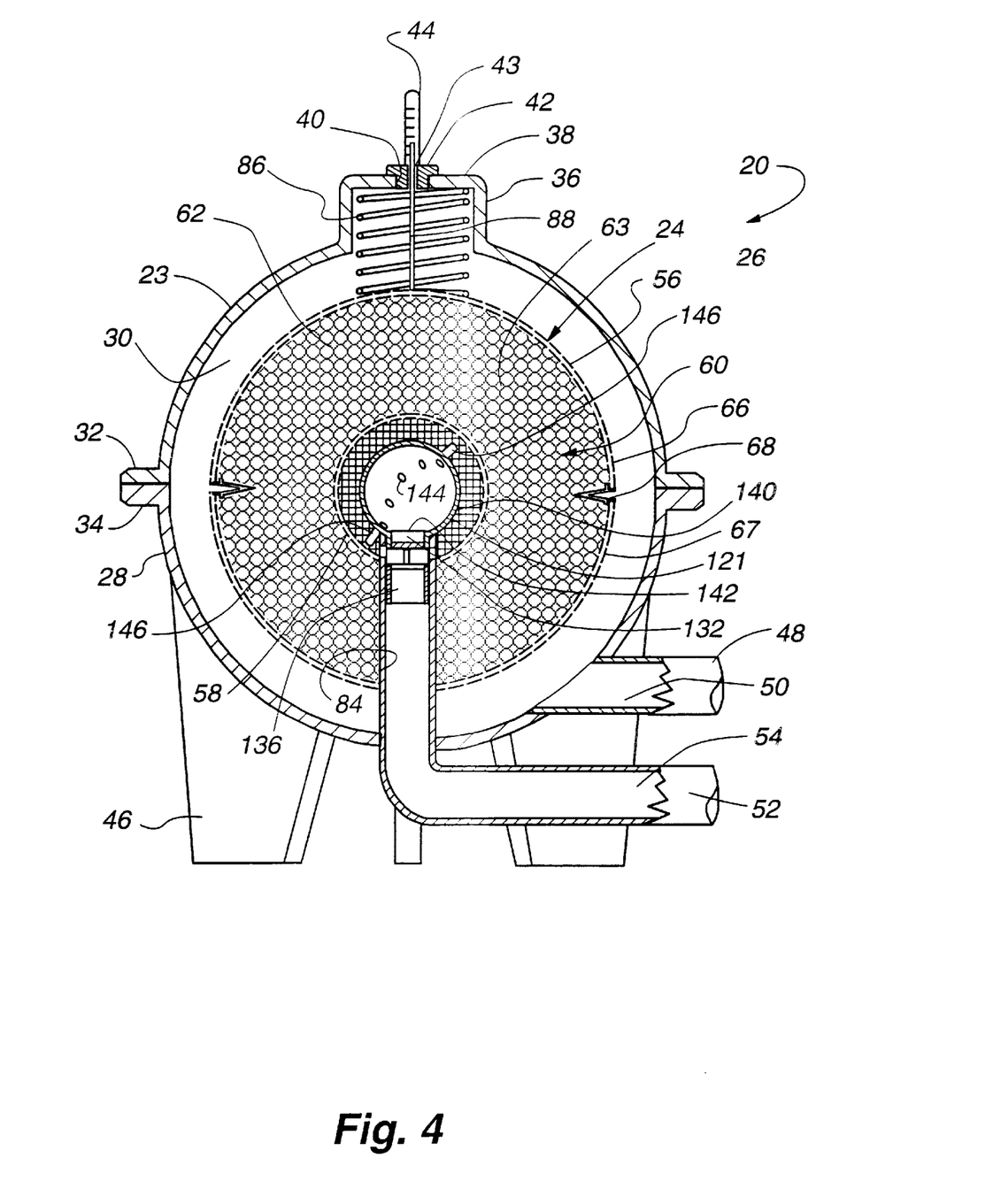
FIG. 4 is a vertical section view of a preferred embodiment of the granular media water filtration device of the present invention.

A presently preferred embodiment of a filtration device 20 for removing contaminants from water using granular filtration media is illustrated in FIGS. 4–8. The filtration device 20 includes an outer pressure vessel assembly 22 which houses an inner filtration assembly 24. Referring now to FIG. 4 it can be seen that the pressure vessel assembly 22 includes a pressure vessel 23 having an upper housing 26 and a lower housing 28 and defining thereby a filtration chamber 30. In the preferred embodiment, the pressure vessel 23 is spherical with the upper housing 26 and the lower housing 28 both substantially hemispherical. However, it should be understood that the pressure vessel 23 may be of any generally orbicular shape, including, for example, a sphere, an ellipsoid, an ovoid or a multifaceted globe such as the volume defined by a geodesic sphere. An annular upper flange 32 extends from the rim of the upper housing 26 for sealing engagement with an annular lower flange 34 which extends from the rim of the lower housing 28.

In the preferred embodiment, a neck 36 is formed in and extends upwardly from the upper housing 26 of the pressure vessel 23, terminating in a cap 38 in which an outer hole 40 is formed. The hole 40 is sealed with a cover 42 having an inner hole 43 centrally formed therein through which a graduated transparent or translucent indicator tube 44 extends. The tube 44 is sealed at its upper end.

The pressure vessel assembly 22 includes a plurality of legs 46 on which the pressure vessel 23 is mounted. The pressure vessel assembly 22 further includes an inlet pipe 48 which defines an inlet passageway 50 in fluid communication with the chamber 30, and an outlet pipe 52 which defines an outlet passageway 54 in fluid communication with the inlet passageway 50 and the chamber 30. External to the pressure vessel assembly 22 is a conventional filter valve arrangement (not shown) which is connected to the inlet and outlet pipes 48 and 52 and allows for selective directional control of water flowing in the inlet and outlet pipes 48 and 52, as is discussed in further detail below.

The filtration assembly 24 includes an outer media container 56 and an inner media container 58 which define therebetween a media subchamber 60 of the chamber 30. Granular media 62 fills and is confined in the subchamber 60 by the outer and inner media containers 56 and 58. In the preferred embodiment, approximately 3 cubic feet of granular media is employed. The arrangement in the present invention of the larger substantially hemispherical outer media container 56 surrounding the smaller, substantially hemispherical inner media container 58 results in a body of granular media 62 which is itself substantially spherical, defines a wall 63 which is substantially uniform in thickness, and has a hollow core defined by the presence of the inner media container 58.

In the preferred embodiment, the outer media container 56 is approximately 22 inches in diameter and the inner media container 58 is approximately 8 inches in diameter. As a result, the wall 63 of granular media 62 is preferably 7 inches thick, and thus the preferred embodiment has an effective media bed depth of approximately 7 inches. Although an effective media bed depth of approximately 7 inches is most preferred, an effective media bed depth of from 6 to 10 inches is also effective.

Figure 6A:
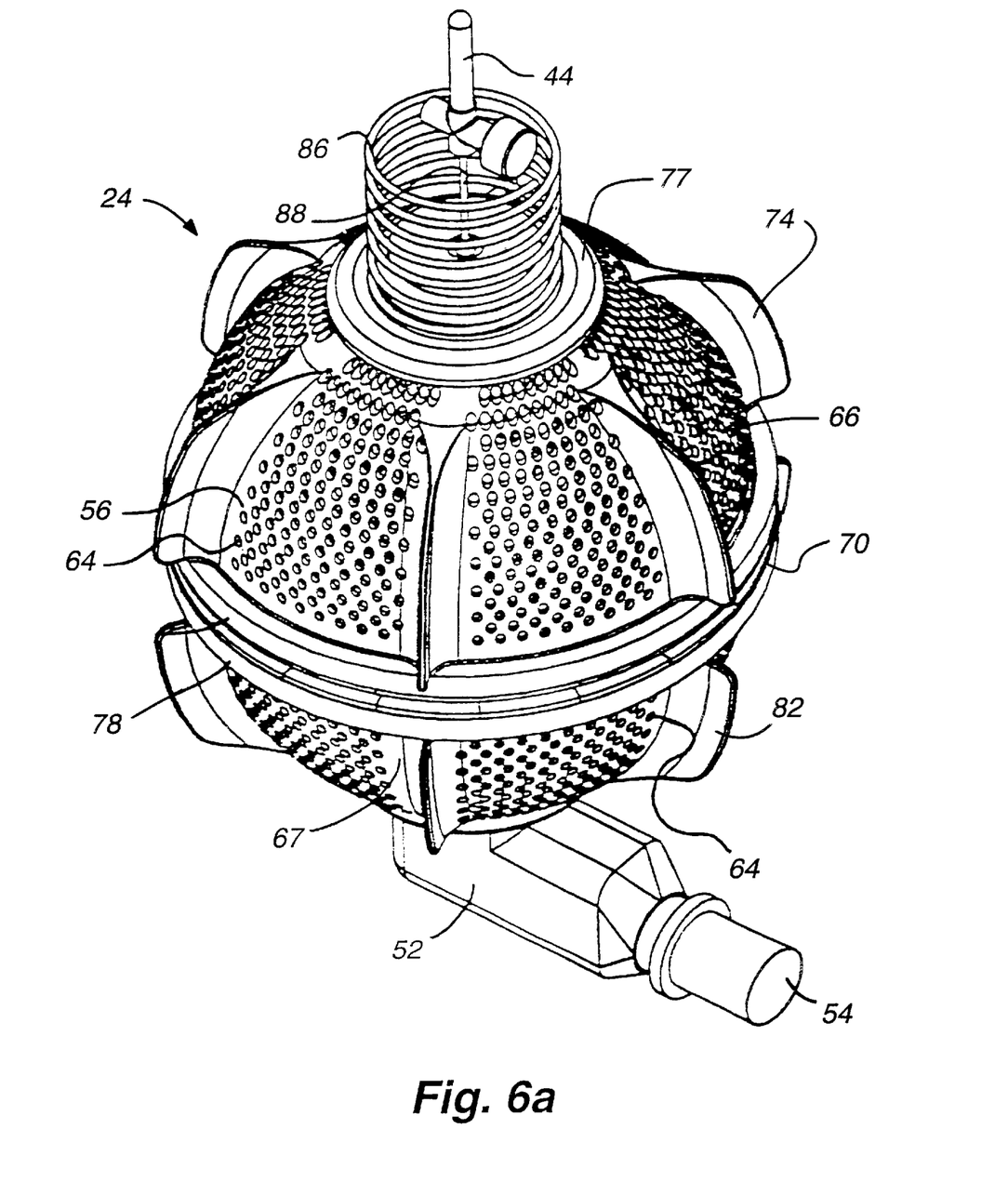
FIG. 6a is an isometric view of a filtration assembly of the water filtration device shown in FIGS. 4, 5a and 5b showing the outer components of the filtration assembly.
Figure 6B:
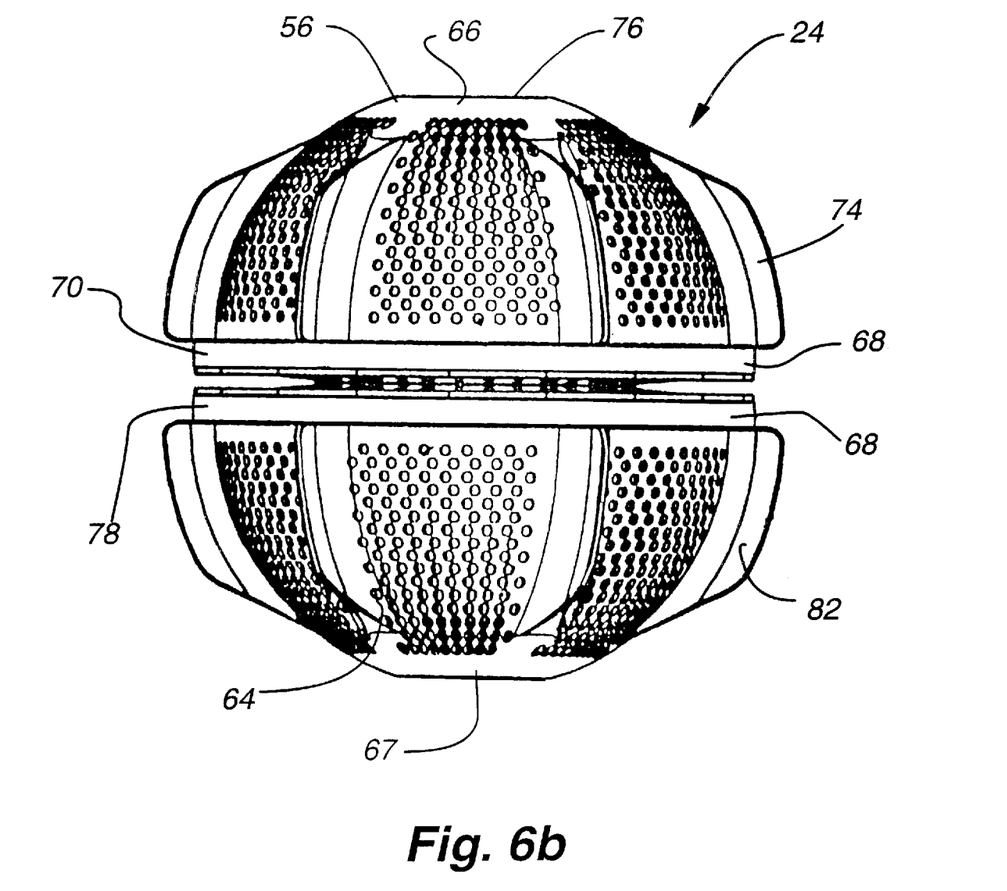

Referring now to FIGS. 6a and 6b, the outer media container 56 is perforated with a plurality of apertures 64 of a size smaller than the diameter of the individual particles of granular media 62. The outer media container 56 includes an upper shell 66 and a lower shell 67 connected by a mechanical bellows 68. While in the preferred embodiment, the outer media container 56 is spherical with the upper shell 66 and the lower shell 67 both substantially hemispherical, it should be understood that the outer media container 56 may be of any generally orbicular shape, including, for example, a sphere, an ellipsoid, a cylindroid, an ovoid or a multifaceted globe such as the volume defined by a geodesic sphere.

The upper shell 66 further includes an annular upper shell flange 70 in which a plurality of oval apertures (not shown) are formed. Also formed in the upper shell 66 are a plurality of regularly spaced and externally projecting upper ribs 74 and a centrally positioned media fill port 76 which is used to add or change the granular media 62. A lid 77 covers the media fill port 76. The lower shell 67 includes an annular lower shell flange 78 in which a plurality of oval apertures (not shown) are also formed. Also formed in the lower shell 67 are a plurality of regularly spaced and externally projected lower ribs 82. The lower ribs 82 support the filtration assembly 24, and in particular allow the outer media container 56 to rest within the pressure vessel 23. A centrally positioned fluid port 84 through which the outlet pipe 52 projects is also formed in the lower shell 67.

Positioned over the lid 77 is a spring 86 which extends upwardly over the upper shell 66 of the outer media container 56 into the portion of the chamber 30 defined by the neck 36 of the upper housing 26 of the pressure vessel 23. An elongated indicator rod 88 rests on the lid 77 and extends up through the neck 36, through the outer hole 40 and the inner hole 43, and into the interior of the graduated indicator tube 44.

Figure 7A:
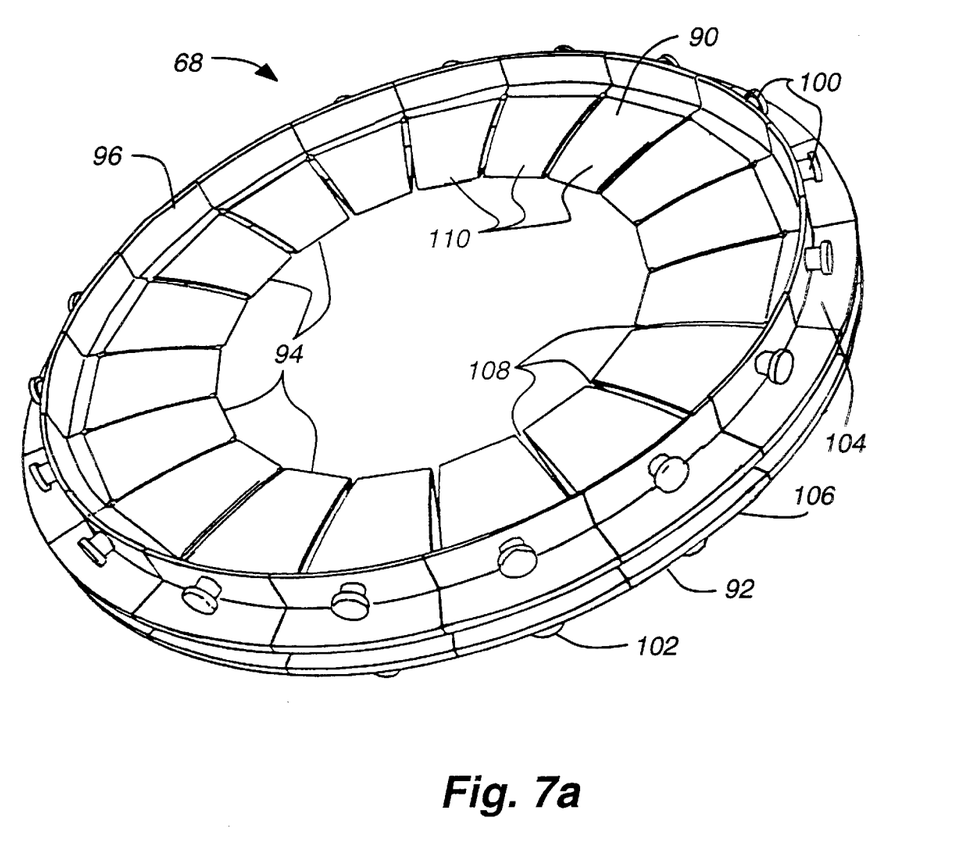
FIG. 7a is an isometric view of a mechanical bellows component of the filtration assembly shown in FIGS. 6a and 6b.
Figure 7B:
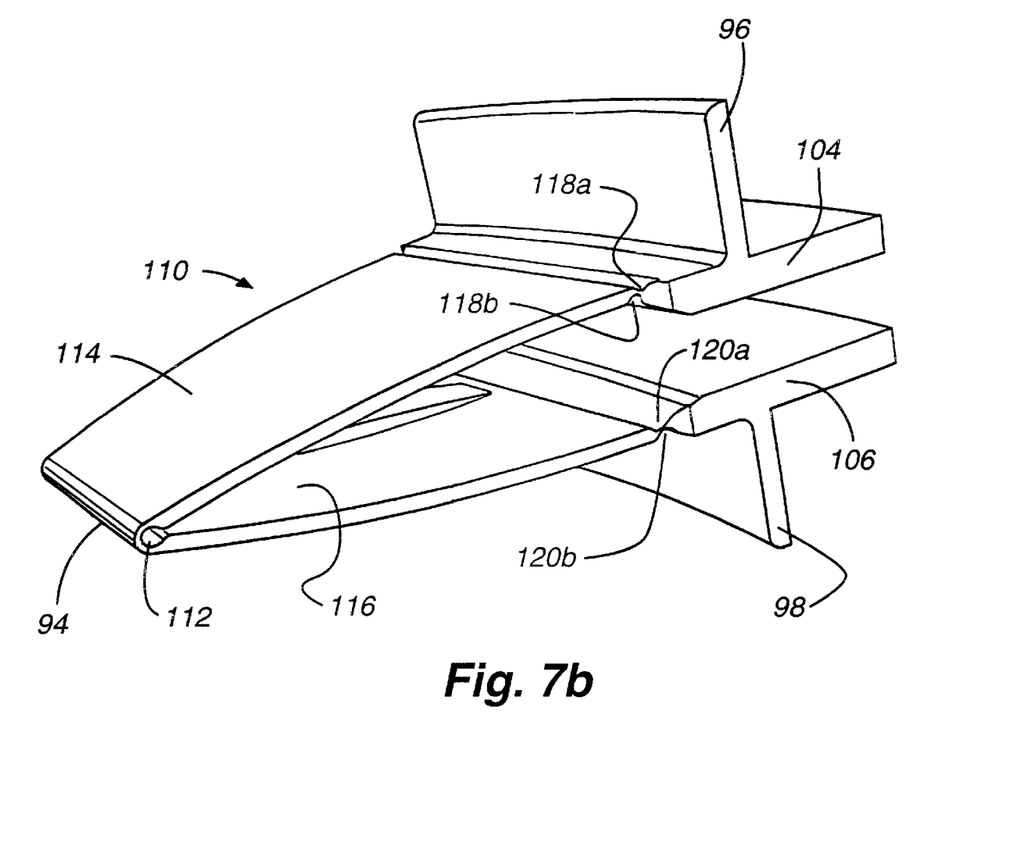

Referring now to FIGS. 7a and 7b, it can be seen that the bellows 68 is a ringlike structure which is symmetrical about a longitudinal first axis and about a second axis transverse and perpendicular to the first axis. The bellows 68 includes an upper bellows half 90 and symmetrical lower bellows half 92 which join at a plurality of central hinges 94. Extending substantially parallel to the longitudinal first axis are an upper bellows flange 96 and an opposing lower bellows flange 98. Mounted to the upper bellows flange 96 and extending outwardly therefrom away from the central hinges 94 substantially along the second axis are a plurality of upper bayonet posts 100. Similarly mounted to the lower bellows flange 98 and extending outwardly therefrom away from the central hinges 94 substantially along the second axis are a plurality of lower bayonet posts 102. An upper bellows lip 104 and a lower bellows lip 106 extend transversely outward from the upper bellows half 90 and the lower bellows half 92, respectively.

Formed in the bellows 68 are a plurality of slits 108 extending radially outwardly from the central hinges 94 dividing the bellows 68 into a plurality of hinged leaf pairs 110. The width of the slits 108 at their widest point does not exceed the diameter of the individual particles of granular media 62. As can be seen in FIG. 7b, formed in each hinged leaf pair 110 is a first channel 112 about which the bellows 68 folds to form the central hinges 94, defining thereby a rigid upper leaf 114 and an opposing rigid lower leaf 116. Also formed in each hinged leaf pair 110 are upper channels 118a and 118b and lower channels 120a and 120b. The upper channels 118a and 118b and the lower channels 120a and 120b are not arcuate, but rather are chords which maintain alignment of the leaf pairs 114 and 116 as they flex about the channels 118a and 118b, and 120a and 120b, respectively.

Figure 8:
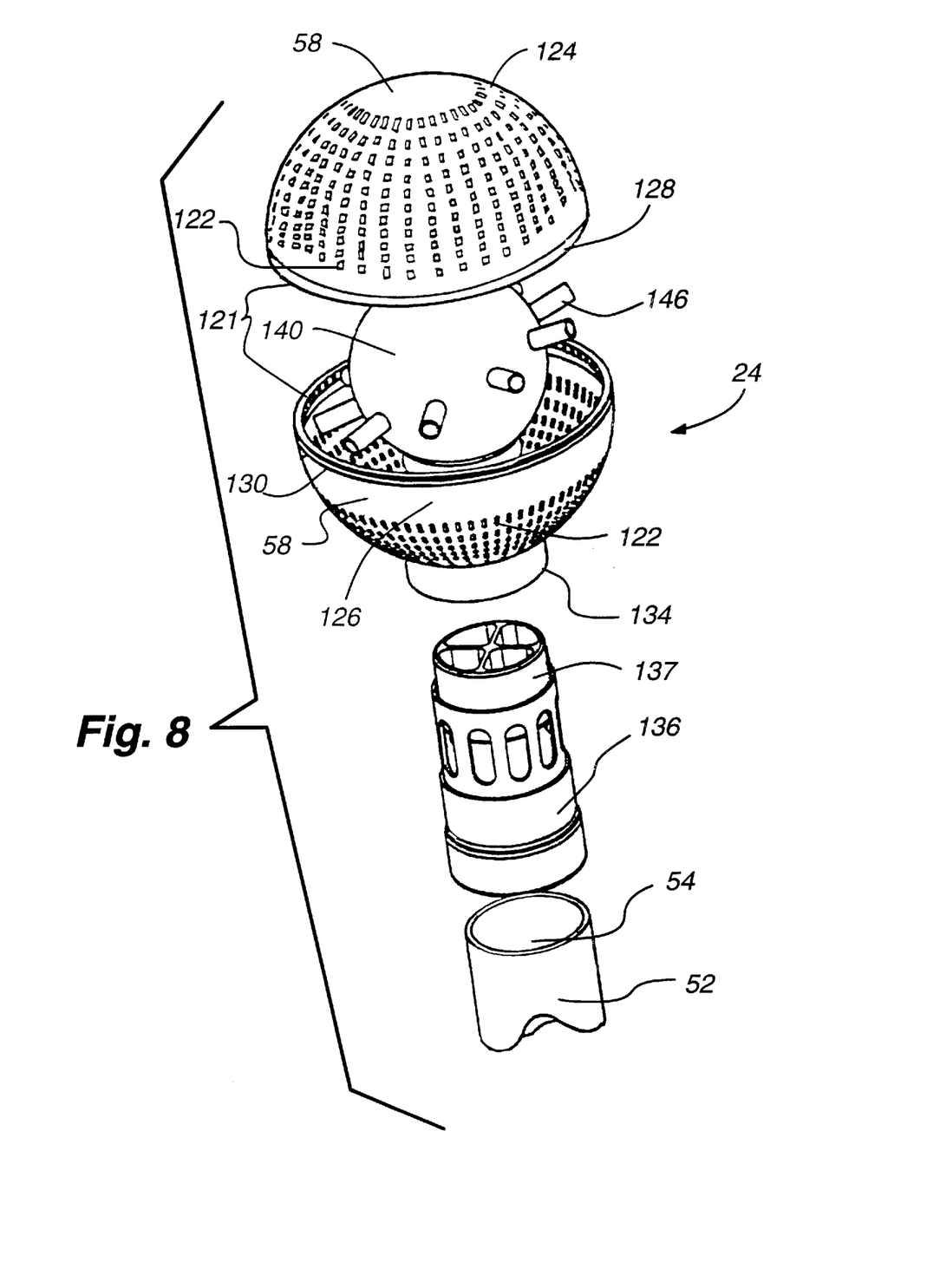
FIG. 8 is an exploded isometric view of the filtration assembly shown in FIGS. 6a and 6b showing the inner components of the filtration assembly.

Referring now to FIG. 8, the inner media container 58 defines an inner collecting chamber 121 (FIG. 4) and is perforated with a plurality of apertures 122 of a size smaller than the diameter of the individual particles of granular media 62. The inner media container 58 is divided into an upper portion 124 and a lower portion 126. The upper and lower portions 124 and 126 releasably engaged at interlocking upper and lower mating flanges 128 and 130 thereof. While in the preferred embodiment, the inner media container 58 is spherical with the upper and lower portions 124 and 126 both substantially hemispherical, it should be understood that the inner media container 58 may be of any generally orbicular shape, including, for example, a sphere, an ellipsoid, a cylindroid, an ovoid or a multifaceted globe such as the volume defined by a geodesic sphere. In the preferred embodiment, the inner media container 58 is a smaller similitude of the outer media container 56, which results in a granular media chamber which is equidistant everywhere and a granular media bed of equal thickness.

Centrally formed in the lower portion 126 of the inner media container 58 is a drain port 132 which is in fluid communication with the inner collecting chamber 121 and which is circumscribed by an annular collar 134. The annular collar 134 is receivably engaged by an inner drain support flange 136 which is, in turn, operatively connected with the outlet pipe 52. A backwash piston 137 is positioned within the drain support flange 136. The backwash piston 137 is selectively positionable to extend upwards through the drain port 132 or rest in a recessed position within the support flange 136.

Positioned within the inner collecting chamber 121 is a spherical, hollow manifold 140 in which is centrally formed a lower backwash port 142 which receives the backwash piston 137 when it is in an upwardly extended position. Also formed in the manifold 140 are a plurality of backwash apertures 144. A plurality of water jets 146 are mounted to and extend outwardly from the manifold 140, with each such jet 146 circumscribing a backwash aperture 144.

When the filtration device 20 of the present invention is assembled and ready to filter water, the manifold 140 rests within the inner media container 158. The lower backwash port 142 of the manifold 140 is aligned with and adjacent to the drain port 132 of the inner media container 158, and the drain port 132 of the inner media container 158 is aligned with and in fluid communication with the outlet passageway 54. The backwash piston 137 is in a recessed position within the support flange 136.

Referring now to FIG. 4, the outer media container 56 surrounds the inner media container 58, retaining the granular media 62 therebetween within the media subchamber 60. The lower shell 67 of the outer media container 56 is attached to the lower bellows half 92 of the mechanical bellows 68 by the previous insertion of the lower bayonet posts 102 into the oval apertures 80 of the lower shell flange 78. The upper shell 66 of the outer media container 56 is attached to the upper bellows half 90 by the previous insertion of the upper bayonet posts 100 into the oval apertures 72 of the upper shell flange 70. Although the lower ribs 82 of the lower shell 67 of the outer media container 56 rest on the lower housing 28 of the pressure vessel 23, the biasing action of the spring 86 prevents the upper ribs 74 of the upper shell 66 of the outer media container 56 from fully contacting the upper housing 26 of the pressure vessel 23.

In this lowered position which occurs during filtration, the indicator rod 88 is visible within the graduated tube 44, but does not extend the length of the graduated tube 44. During filtration, water flows through the inlet passageway 50, enters the chamber 30, surrounds the outer media container 56 therein, passes through the apertures 64 in the outer media container 56, into the granular media 62, through the inner media container perforations 122, collects in the inner collecting chamber 121, and passes through the drain port 132 into the outlet passageway 54 for removal from the system.

Figure 5A:
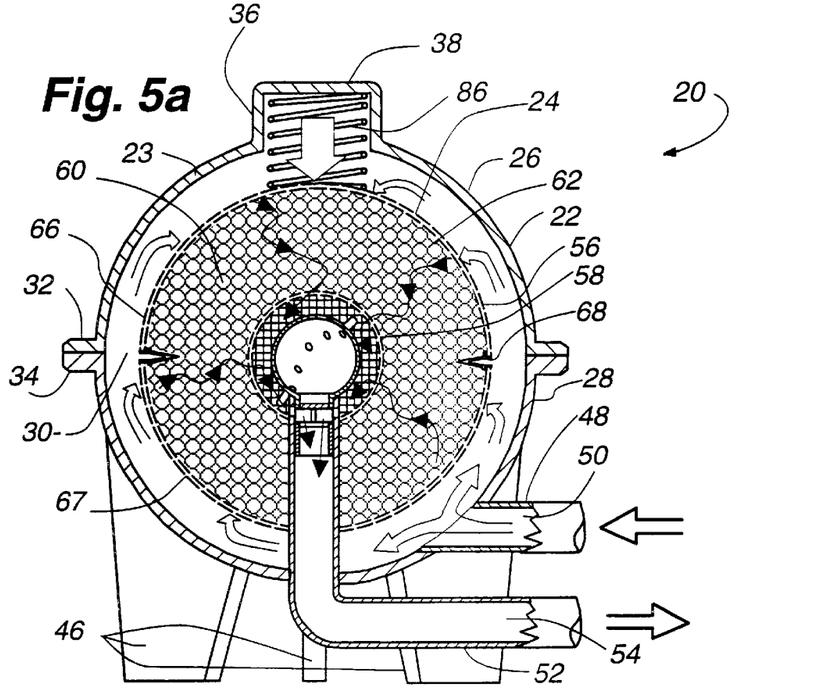
FIG. 5a is a vertical section view of the water filtration device shown in FIG. 4 in filtration mode.

The upper shell 66 of the outer media container 56 is a dynamic hemisphere which, as shown in filtration mode in FIG. 5a, is at its lowest operating position along the central vertical axis of the filtration assembly 24. In this position, the dynamic upper shell 66 transfers a downward compaction force on the media 62. This compaction force is created by the compression spring 86 and a resistance of the granular media 62 to the inward radial flow of water during filtration. This resistance to flow is created by the size and number of the perforations 64 of the outer media container 56 in relation to the normal flow rate of the water during filtration mode. Preferably, the total open area of the perforations 64 is from approximately 60% to 80% of the cross-sectional area of the inlet passageway 50. The desirable net result of this compaction force exerted on the granular media 62 by the dynamic upper shell 66 is that the granular media 62 is compacted and maintained in a static and compacted state throughout filtration.

Figure 5B:
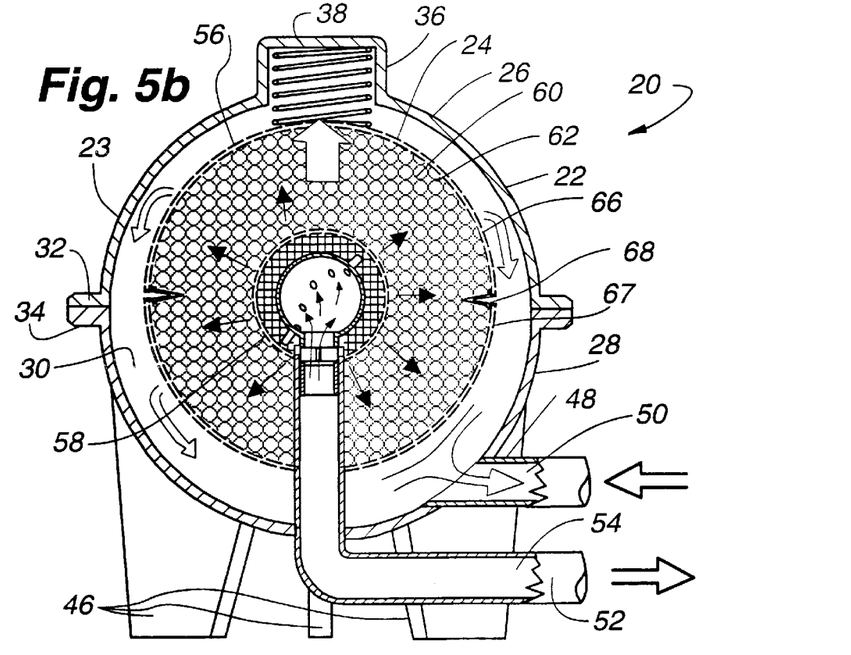
FIG. 5b is a vertical section view of the water filtration device shown in FIG. 4 in backwashing mode.

Referring now to FIG. 5b it can be seen that the dynamic upper shell 66 assumes a higher position during backwashing. During backwashing, water flow is reversed from the flow during filtration. Water is introduced into the outlet passageway 54, the backwash piston 137 extends upwardly through the drain port 132 and into the manifold 140, water flows therethrough into the manifold 140 and is forcefully directed at the inner media container 58 through the jets 146. The water then passes through the inner media container perforations 122 and into the filter media 62. Due to the release of the compaction force, the granular media 62 fluidize and move about within the media subchamber 60. More particularly, the backwash jets 146 and the manifold 140, which remain dormant during filtration operations, create a plurality of high-velocity, radially divergent currents that produce a violent turbulence within the granular media 62 which rapidly cleans the individual grains of the filtration media 62.

The freedom of the granular media 62 to move during backwashing is aided by the increase in volume of the chamber 30 by the opening of the mechanical bellows 68. Although the individual hinged leaf pairs 110 of the mechanical bellows 68 open, with opposing upper and lower leaves 114 and 116 spreading apart, the granular media 62 is prevented from escaping the outer media container 56 due to the narrow width of the slits 108 of the mechanical bellows 68. As the granular media 62 is agitated by the high-velocity outward radial flow created by the backwash water jets 146, material previously adhering to or trapped in the granular media 62 is freed and passes in the backwash water out the apertures 64 of the outer media container 56, into the chamber 30 and out the inlet passageway 50. The granular media 62 is thereby cleaned.

It should be noted, however, that when the preferred embodiment of the filtration device 20 of the present invention is in backwash mode, the angle formed between the upper and lower leaves 114 and 116 increases as the common central hinge 94 adjacent the first channel 112 moves outward radially away form the central longitudinal axis of the filtration assembly 24. This movement causes the slits 108 to increase to a predetermined width not exceeding the individual grain size. Moreover, by limiting the vertical travel of the upper shell 66 by contact of the upper ridges 74 with the upper housing 26, the angle formed by each hinged leaf pair 110 does not increase beyond an acute angle, and the hinged leaf pair 110 is not susceptible to moving beyond the outer media container 64 into the chamber 30.

In the preferred embodiment, the total open area of the backwash jets 146 is from approximately 30% to 50% of the open area of the inlet passageway 50, thereby providing a restriction to flow during backwash. This restriction to flow results in a pronounced increase in pressure and velocity of the water currents through the granular media 62 during backwashing which in turn results in turbulence and agitation of the media 62 during backwashing. The media 62 is thereby cleaned efficiently and thoroughly.

The upward movement of the dynamic upper shell 66 that occurs during the backwash cleaning mode is caused by an upward force exerted by the resistance to flow created by the total open area of the apertures 64 of the outer media container 56. Moreover, because a standard backwash valve (not shown) reverses the flow of water through the granular media 62 during the backwash cleaning mode, the normal inward radial flow is reversed to an outward radial flow. The resistance to outward radial flow created by the outer media container 56 results in a lifting force being exerted on the dynamic upper shell 66. This lifting force is equal to pressure differential created by the apertures 64 multiplied by the cross-sectional area of the outer media container 56 at its equator.

Thus, for example, if the pressure drop across the media container 56 is 3 pounds per square inch, and the cross-sectional area of the outer media container 56 at its equator is 380 square inches, then the lifting force exerted on the dynamic upper shell 66 is 1140 lbs. This lifting force then overcomes the downwardly biasing force being exerted on the upper shell 66 by the compression spring 86, which in the preferred embodiment is approximately 80 pounds. As a result, the dynamic upper shell 66 rises to the top of upper housing 26 of the pressure vessel 23, as limited by the upper ribs 74 of the upper shell 66. The indicator rod 88, which, as described above, is resting on the upper shell 66, travels upwards into the graduated indicator tube 44, with its degree of travel indicative of the pressure differential created during the backwash operation. The indicator rod 88 also apprises the filtration device operator if the dynamic upper shell 56 is functioning properly and if a compaction force is being exerted on the granular media 62 during filtration.

If the loss of granular media 62 caused by the normal attrition of operation causes the volume of media 62 to be less than the volume of the media subchamber 60 when the dynamic upper shell 56 is at its lowest position (FIG. 5a), then the upper shell 66 would be unable to maintain a compaction force on the media 62. In this undesirable situation the filtration device 20 cannot function optimally because the individual grains of the media 62 grains are free to move about during filtration. This condition, which requires immediate service, is also communicated to filter operator by the indicator rod 88. This is because the graduated indicator tube 44 has a lower mark which tells the operator the filtration device 20 has lost its ability to compact the media 62 when the indicator rod 88 is adjacent the lower mark.

Optionally, for slow flow filtration applications like those that utilize activated carbon or a de-ionizing media, an alternate assembly can be installed in place of the backwash piston 137, the manifold 140 and the backwash jets 146. This alternate assembly incorporates a flow-actuated rotating diverter (not shown) which is rotatably mounted on a common vertical axis within the inner media container 58. This diverter rotates during both filtration and backwashing. The rotating diverter provides the only flow path through the inner media container 58 and only draws from one sector of the media subchamber 60 at a time. It has an impeller-like shape, and as a result, rotates in the presence of flow. This rotating diverter provides a constantly changing flow path through the granular media 62 that results in a uniform exhaustion of the granular media 62 during filtration, and functions like the backwash jet 146 during backwashing.

Because of the unique configuration of the present invention, water can be filtered in a highly efficient manner with equipment that utilizes a minimum of granular media at a relatively small size. Because the granular media is formed into a hollow sphere having a substantially constant wall thickness, a minimal but substantially constant bed depth is thereby established. The majority of the granular media is actively used and water to be filtered does not have to pass relatively long distances through media after it is cleaned. As a result, filtration time is substantially decreased over existing systems.

Channel formation within the granular media is also prevented with the present invention. Thus the passage of unfiltered water out of the filtration device is minimized.

In addition, the compaction of the granular media throughout filtration minimizes attrition of the granular media because the particles are not so free to rub against adjacent particles. The frequency of granular media replacement is thereby decreased.

Moreover, backwashing operations allow for the immediate removal of water transporting matter previously collected by the granular media, rather than a gradual removal as backwashing water is diluted and removed. Thus, the downtime for backwashing is significantly decreased.

Presently preferred embodiments of the present invention and many of its improvements have been described with a degree of particularity. It should be understood, however, that the present invention is defined by the spirit and scope of the following claims.

What is claimed is:

1. A water filtration device adapted to filter water containing dissolved and suspended matter through a granular media in a filtration mode, said water filtration device comprising:

a generally orbicular pressure vessel having an inner wall and defining a filtration chamber;

a water inlet pipe in fluid communication with said filtration chamber;

a water outlet pipe in fluid communication with said water inlet pipe and said filtration chamber;

an orbicular perforated outer media container defining an outer media chamber therein, said perforated outer media container positioned in said filtration chamber and spaced apart from said inner wall of said pressure vessel;

a perforated inner media container defining a collection chamber therein, said perforated inner media container positioned in said outer media chamber, said perforated outer media container and said perforated inner media container defining a filtration media subchamber therebetween which is filled with said granular media; and a spring mounted in said filtration chamber for applying a compacting force to said granulated media through said perforated outer media container to compact said granulated media during the filtration mode.

2. The water filtration device according to claim 1 wherein said filtration media subchamber has a substantially uniform width throughout.

3. The water filtration device according to claim 1 wherein said perforated outer media container and said perforated inner media container are substantially spherical and said perforated inner media container is a proportionately smaller similitude of said perforated outer media container.

4. The water filtration device according to claim 1 wherein said perforated inner media container is a proportionately smaller similitude of said perforated outer media container.

5. The water filtration device according to claim 4 wherein said perforated outer media container is of a shape selected from the group consisting of spheres, cylindroids, ovoids, ellipsoids and multifaceted globes.

6. The water filtration device according to claim 4 further comprising:

a diverter positioned in the pressure vessel to direct unfiltered water from the input pipe radially perpidicular to a longitudinal axis of the water inlet pipe.

7. The water filtration device according to claim 1 wherein the outer media container comprises:
   an upper shell;
   a lower shell; and
   a mechanical bellows flexibly connecting the upper shell to the lower shell while preventing granular media from escaping from the filtration media subchamber.

8. The water filtration device according to claim 7 wherein the filtration device is further adapted to operate in a backwashing mode and wherein the upper shell and lower shell are closer together during the filtration mode, the upper shell and lower shell are farther apart during the backwashing mode, and the filtration subchamber has a first volume during filtration mode which is smaller in volume than a second volume of the filtration subchamber during backwashing mode.

9. The water filtration device according to claim 7 wherein the mechanical bellows includes a plurality of hinged leaf pairs.

10. The water filtration device according to claim 7 wherein the mechanical bellows comprises a plurality of independent leaf pairs each hinged together at one end to form an angle and hinged at the opposing leaf pair ends one each to one of the upper and lower shells, for providing convergent movement of the upper and lower shells and simultaneously decreasing the angle of each leaf pair during filtration mode and providing divergent movement of the upper and lower shells and simultaneously increasing the angle of each leaf pair during backwashing mode.

11. The water filtration device according to claim 1 further comprising:
   a manifold positioned in the collection chamber and having a plurality of jets out of which high-velocity radially divergent water flow is directed to act upon the granular media to create a backwashing mode in which the granular media is agitated and material collected thereon is removed.

12. The water filtration device according to claim 11 wherein said manifold is substantially spherical.

13. A water filtration method which comprises the steps of:
   establishing a cache of granular water filtration media in the shape of a hollow orb having a media bed depth everywhere substantially equal;
   suspending said cache of granular water filtration media within a generally orbicular pressure vessel;
   mechanically compacting said cache of granular water filtration media;
   enveloping said cache of granular water filtration media with unfiltered water while continuing to compact said cache of granular water filtration media;
   penetrating said cache of granular water filtration media with said unfiltered water and passing said unfiltered water through said media to produced filtered water while continuing to mechanically compact said cache of granular water filtration media; and
   collecting said filtered water.

14. A method of filtering matter from a liquid, said method comprising the steps of:
   providing an outer orbicular perforated first media container and an inner perforated second media container and defining a media filtration chamber between said perforated first media container and said perforated second media container, said outer and inner perforated first and second media containers being adapted for positioning in a generally orbicular pressure vessel;
   filling said media filtration chamber with granular media;
   mechanically applying a compacting force to said granular media in said media filtration chamber to produce a compacted granular media;
   filtering said liquid through said perforated first media container, then through said compacted granular media, then through said perforated second media container to produced a filtered liquid;
   continuously maintaining said mechanical compacting force on said compacted granular media while said performing said filtering step; and
   removing said filtered liquid.

15. The method according to claim 14 wherein said perforated first media container is substantially spherical and wherein said second perforated media container is substantially spherical, is smaller in diameter than said perforated first media container and is positioned inside said first perforated media container.

16. The method according to claim 15 wherein, after application of said compacting force said media filtration chamber has a volume, and wherein after said filtered liquid removing step is performed, said method further comprises the step of:
   backwashing the compacted filtration media by
      removing said compacting force from said granular media
      increasing said volume of said filtration chamber; and
      filtering additional liquid through said perforated second media container, then through said granular media, then through said perforated first media container to produced a backwash liquid.

17. The method according to claim 16 wherein the backwashing step is conducted for not more than three minutes.

18. The method according to claim 14 wherein, after application of said compacting force said media filtration chamber has a volume, and wherein after said filtered liquid removing step is performed, said method further comprises the step of:
   backwashing the compacted filtration media by
      removing said compacting force from said granular media;
      increasing said volume of said filtration chamber; and
      filtering additional liquid through said perforated second media container, then through said granular media, then through said perforated first media container to produced a backwash liquid.

19. The method according to claim 18 wherein the backwashing step is conducted for not more than three minutes.

20. A water filtration method comprising the steps of:
   establishing an orbicular cache of granular water filtration medial;
   suspending said cache of granular water filtration media in a generally orbicular pressure vessel;
   mechanically compacting said cache of granular water filtration media;
   subjecting said compacted granular water filtration media to a radial flow of water to produce filtered water;
   continuing to perform said compacting step while maintaining said radial flow of water;
   collecting said filtered water; and
   discontinuing said compacting step while subjecting said granular water filtration media to a cleansing flow.

21. The water filtration method of claim 20 wherein said cache of granular water filtration media has a plurality of substantially equidistant flow paths and said radial flow is an inward radial flow.

22. The water filtration method of claim 20 wherein said cache of granular water filtration media has a plurality of substantially equidistant flow paths and said radial flow is an outward radial flow.

23. The water filtration method of claim 20 wherein said cache of granular water filtration media is a hollow orb having a hollow center and a plurality of substantially equidistant flow paths, said radial flow is an inward radial flow into said hollow center and said filtered water collecting step includes the step of collecting said filtered water from said hollow center.

24. The water filtration method of claim 23 wherein said cache of granular water filtration media has a volume of interstices, said granular water filtration media compacting step is initially performed prior to subjecting said granular water filtration media to said radial flow of water, and said volume of interstices is reduced upon initial performance of said granular water filtration media compacting step.

25. The water filtration method of claim 20 wherein said cache of granular water filtration media is a hollow orb having a hollow center and a plurality of substantially equidistant flow paths and said radial flow is an outward radial flow from said hollow center.

26. The water filtration method of claim 25 wherein said cache of granular water filtration media has a volume of interstices, said granular water filtration media compacting step is initially performed prior to subjecting said granular water filtration media to said radial flow of water, and said volume of interstices is reduced upon initial performance of said granular water filtration media compacting step.

* * * * *